United States Patent [19]
Dudley et al.

[11] Patent Number: 6,044,786
[45] Date of Patent: Apr. 4, 2000

[54] SEISMIC CABLE RETRIEVAL SYSTEM

[75] Inventors: Timothy A. Dudley, New Iberia, La.; Joseph R. Scarlett, Houston, Tex.

[73] Assignee: Western Atlas International, Inc., Houston, Tex.

[21] Appl. No.: 08/702,145

[22] Filed: Aug. 23, 1996

[51] Int. Cl.⁷ .................................................. B63B 21/56
[52] U.S. Cl. .................... 114/242; 114/254; 242/364
[58] Field of Search .................... 114/242–244, 253, 114/254; 367/15, 16, 20; 242/364, 397, 397.1, 397.2; 254/134.35 C; 294/66.1; 226/92

[56] References Cited

U.S. PATENT DOCUMENTS 2,981,454  4/1961  Dickinson et al. .................... 254/134.3

FOREIGN PATENT DOCUMENTS 1520459  11/1989  U.S.S.R. .................................. 367/15
1231486   5/1971  United Kingdom ................... 114/244

*Primary Examiner*—Ed Swinehart
*Attorney, Agent, or Firm*—Alan J. Atkinson

[57] ABSTRACT

An apparatus supported by a vessel for removing a seismic cable and attached buoy from water. A clamp for gripping the cable and attached buoy is connected to a boom. The boom manuevers the clamp into engagement with the floating buoy, lifts the buoy from the water, and moves the buoy horizontally relative to the vessel. A cable puller can cooperate with the boom to reel the cable from the water without requiring manual intervention. The boom can comprise an extensible, telescoping structure or an articulated structure. Multiple cable ends can be independently captured to permit cable installation or repair, and the operations can be facilitated with a control panel for operating the moving components.

18 Claims, 2 Drawing Sheets

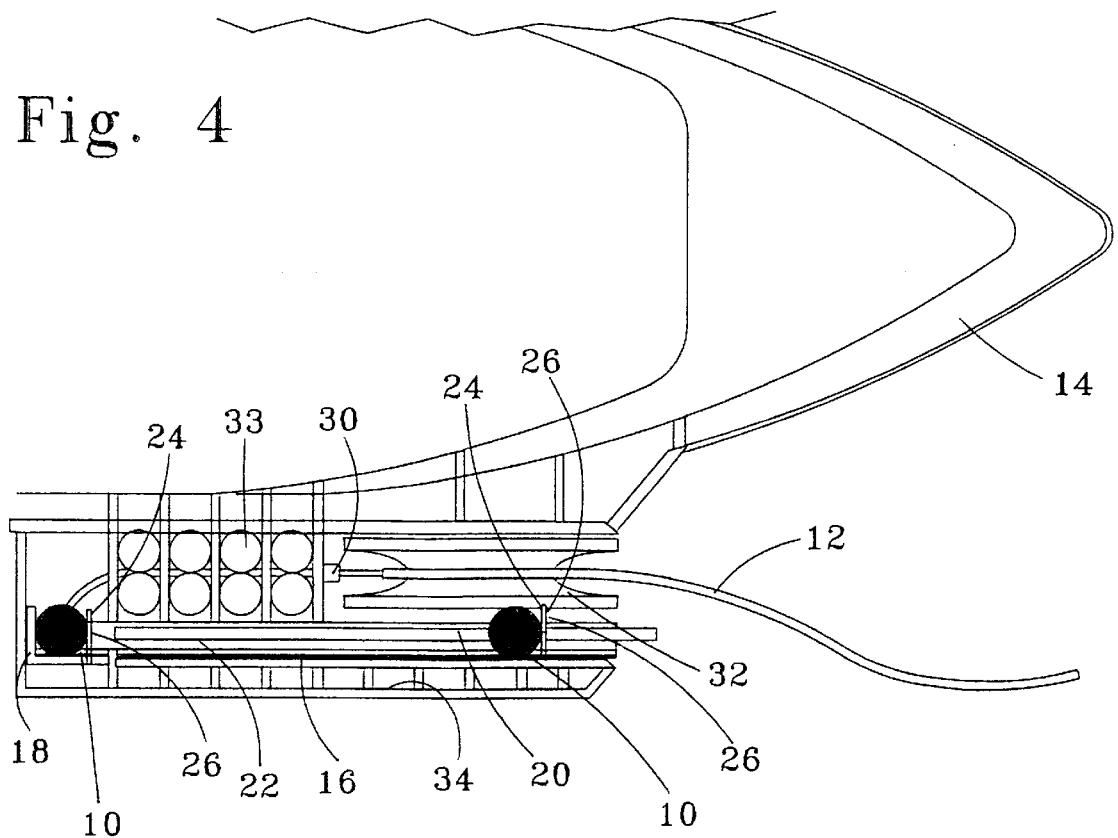
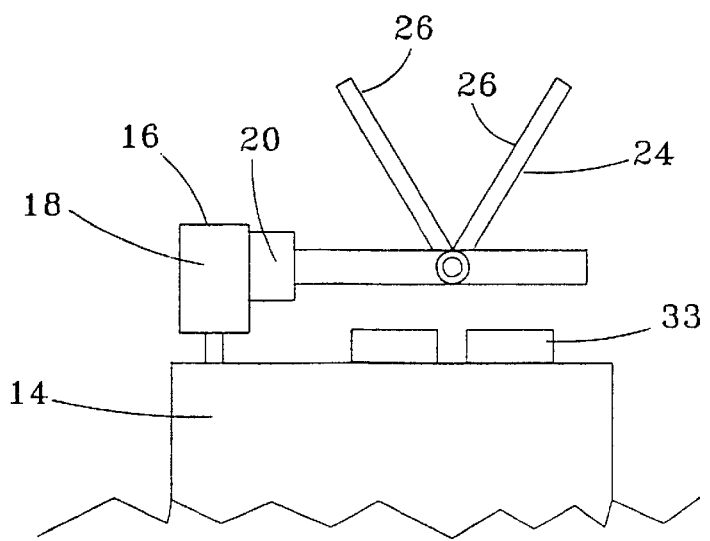

SEISMIC CABLE RETRIEVAL SYSTEM

BACKGROUND OF THE INVENTION

The present invention relates to the field of seismic cable recovery. More particularly, the present invention provides a system for retrieving seismic cables and attached buoys from a body of water.

Marine seismic operations utilize floating buoys and attached cables to suspend streamers, air guns and other equipment. The buoys mark the geographic position and orientation of submerged seismic equipment and provide a surface point of attachment for retrieving such equipment. The submerged streamers typically comprise communication lines for transmitting signals, cable stress bearing elements, and hydrophones for detecting seismic source waves reflected from subsurface geologic formations. The hydrophones convert the acoustic waves to signals which can be processed to evaluate the geologic formation structure.

Submerged seismic components are removed from the water to repair defects and to move the components to another location. A work vessel provides a floating base for capturing the buoy and for removing the buoy, cable, and seismic components from the water. In conventional cable retrieval operations, deck hands manually snag a buoy with grappling guns, hooks, poles or lines. The buoy and attached cable are manually pulled over an extended beam or "cathead" onto the vessel deck, the buoy is detached from the cable, and the cable is engaged with a rotating drum or wheel for winching the cable onto the vessel deck. As the cable is retrieved, seismic components are detached from the cable for storage on the vessel deck.

Manual seismic cable retrieval operations are cumbersome, hazardous, and frequently cause injuries. The risk of injury is particularly acute in rough seas when the vessel heaves and pitches relative to the buoys and seismic cables.

Various retrieval systems have been proposed to recover buoys and cables from water. U.S. Pat. No. 3,993,011 to Garland (1976) disclosed a mechanism for retrieving and launching barge anchor buoys. A cradle was positioned underneath a buoy, the cradle was pivoted upwardly to lift the buoy from the water, and the buoy was moved to the stern deck of a service vessel.

In other systems, U.S. Pat. No. 4,552,086 to Boe et al. (1985) disclosed a boom having hoist wires engaged with hoisting drums on a longitudinal axle. The axle was attached to suspension drums having wires for supporting submerged air guns below the axle. Rotation of the suspension drums raised the air guns relative to the axle, and the hoist wires were reeled in to lift the axle relative to the boom. In another system, U.S. Pat. No. 4,798,156 to Langeland et al. (1989) disclosed a winch for retrieving a cable over a guide pulley. Side mounted derricks were manuevered with hydraulic cylinders to draw the cables toward the vessel, and rear mounted derricks were operable to move cables deployed from the vessel stern. Additionally, U.S. Pat. No. 4,798,158 to Langner (1989) disclosed a docking cone for engaging one end of a seismic float. The docking cone could be raised to elevate one end of the seismic float, and a "latching saddle" or cables secured the float to the vessel.

Although these systems provide various techniques for reeling in buoys, cables and attached components, none of these systems provide an efficient system for retrieving seismic cables and attached components. Accordingly, a need exists for an improved retrieval system that facilitates the safe capture and retrieval of seismic cables and attached components.

SUMMARY OF THE INVENTION

The present invention overcomes the limitations of the prior art by providing an improved apparatus supported by a vessel for removing a seismic cable and attached buoy from water. The apparatus comprises a clamp for gripping the cable, a boom attached to the clamp for moving the clamp into engagement with the cable and for transporting the clamp and engaged cable from the water, and an actuator engaged with the boom for lifting the clamp and cable above the water and for moving the clamp and cable in a substantially horizontal direction relative to the vessel.

In other embodiments of the invention, a cable puller can grasp the cable and a control panel can direct the operation of the clamp, boom and actuator. The clamp can comprise two forks for releasably gripping the cable. The boom can comprise an extendible telescoping structure attached to the clamp or can comprise an articulated structure for gripping the cable, for lifting the clamp and cable from the water, and for moving the clamp and cable in a substantially horizontal direction relative to the vessel.

BRIEF DESCRIPTION OF THE DRAWINGS

FIG. 3 illustrates one embodiment of a cable clamp.

FIG. 4 illustrates a plan view of the invention.

DESCRIPTION OF THE PREFERRED EMBODIMENTS

Figure 1:
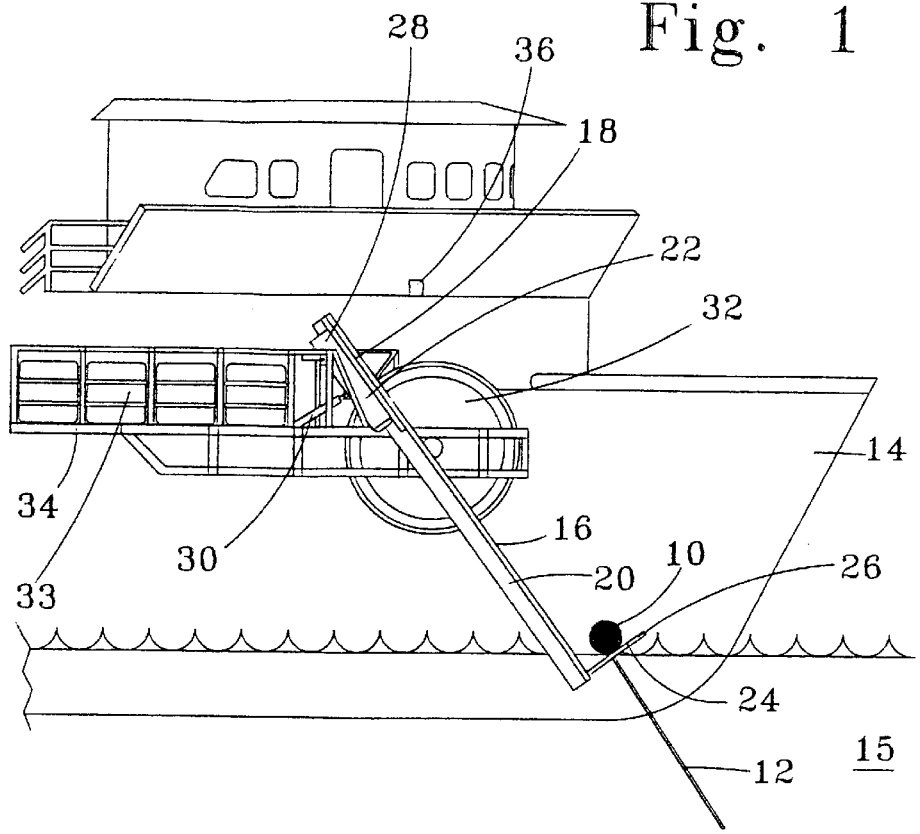
FIG. 1 illustrates an elevation view of the invention engaged with a floating buoy.
Figure 2:
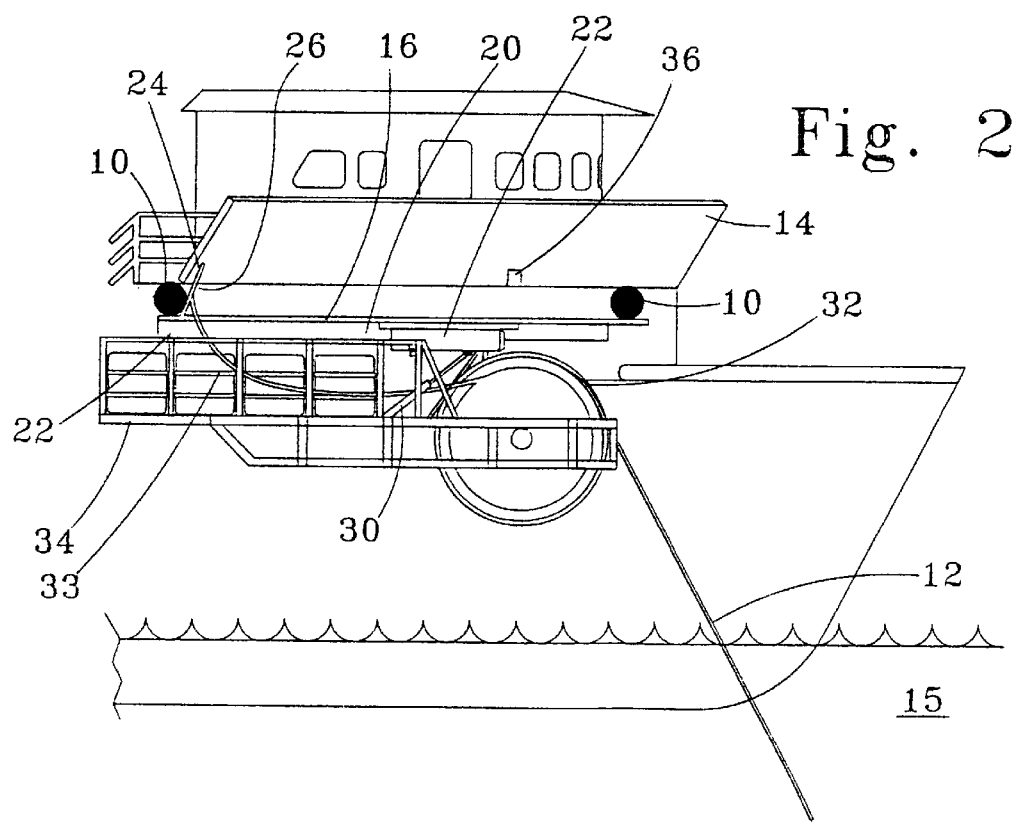
FIG. 2 illustrates an elevation view of the boom withdrawn to a horizontal position for transporting the buoy relative to the vessel.

The invention provides a unique seismic cable retrieval system for recovering seismic cables and attached equipment from a body of water. FIGS. 1 and 2 illustrate the invention in contact with buoy 10 and cable 12. As used herein, cable 12 can comprise a seismic streamer, strength member, communication line, or leader wire connected to seismic streamers or other seismic equipment (not shown). Buoy 10 is sufficiently buoyant to mark equipment locations or to support the weight of cable 12 and submerged seismic equipment attached to cable 12. Vessel 14 supports the invention above water 15 and provides a manueverable working deck for capturing and retrieving buoy 10. Vessel 14 can comprise a ship, barge, mobile platform or other seaworthy base. Vessel 14 typically has a forward bow and rearward stern.

Extensible boom 16 includes base 18 and extension 20 generally formed along a longitudinal axis extending lengthwise along base 18. Chain drive 22 provides a force to reciprocally move extension 20 in opposite directions relative to base 18. Alternatively, a hydraulic cylinder or mechanical device could perform this reciprocating function provided by chain drive 22. Cable clamp 24 is attached to extension 20 for engagement with cable 12 or buoy 10. In a preferred embodiment of the invention, clamp 24 grips cable 12 so that positive contact with cable 12 is not released until cable 12 is secured on the deck of vessel 14 as described below.

Conventional buoy retrieval systems required a capturing mechanism adaptable to buoys of different configurations and operating characteristics. Because cable 12 provides a uniform structural form along its length, a single clamp 24 can be used without requiring modification. Additionally, the gripping location of clamp 24 at different locations along cable 12 can be selected to accomplish different objections. A certain amount of cable 12 slack between the point of gripping engagement and buoy 10 may be desirable to facilitate the removal of buoy 10, or clamp 24 could grip cable 12 adjacent buoy 10 so that clamp 24 engages both cable 12 and buoy 10 as such components are raised from water 15.

The length, inclination and articulation of boom 16 and extension 20 can be manipulated to adjust the vertical elevation and horizontal position of clamp 24, or to adjust the forward reach of clamp 24 in front of vessel 14. Clamp 24 is preferably extendable fore of vessel 14 so that cable 12 does not contact vessel 14 when cable 12 is raised above the surface of water 15.

In one embodiment of the invention, clamp 24 can include two members 26 which can be selectively opened and closed to capture, retrive, and release cable 12 and attached buoy 10. Forks 26 can be opened and closed with mechanical or hydraulic devices, such as a hydraulic ram supplied through stainless steel hydraulic lines. Forks 26 can be parallel or can be formed in a V-shaped configuration in a preferred embodiment of the invention as shown in FIG. 3. For the V-shaped pattern of forks 26, the open end of the V encloses cable 12, and movement of vessel 14 forward in water 15 will draw cable 12 toward the pointed end of the V. Continued movement will cause buoy 10 to be drawn toward forks 26, and forks 26 can be closed to grasp cable 12.

The V-shape of forks 26 causes cable 12 to cinch tighter within forks 26 as vessel 14 moves in water, or as cable 12 is withdrawn from water 15. In other embodiments of the invention, clamp 24 can comprise other configurations suitable for engaging buoy 10 or cable 12. The term "clamp" as used herein means any device for joining, gripping, supporting, engaging or compressing cable 12 or attached buoy 10. Clamp 24 can be pivoted relative to extension 20 to change the relative orientation of clamp 24 relative to extension 20.

As shown in FIG. 1, chain drive 22 is operated to move telescopic extension 20 outwardly so that clamp 24 is proximate to the desired gripping engagement with cable 12. Boom 16 is then rotated about pivot point 28, by operating an actuator such as hydraulic cylinder 30 connected to vessel 14, until boom 16 is oriented in a substantially horizontal position as shown in FIG. 2. Chain drive 22 is operable to retract extension 20 relative to base 18 as shown in FIG. 2, thereby transporting clamp 24 and attached cable 12 horizontally relative to vessel 14. During this substantially horizontal movement of clamp 24, cable 12 can be engaged with wheel 32 and with cable puller 33 for grasping cable 12 and for reeling cable 12 and attached seismic components from water 15. Wheel 32 controls the bending radius of cable 12 as cable 12 is retrieved.

As used herein, the term "cable puller" means a rotatable, linear, or cable folding device for storing lengths of cable 12. Cable puller 33 can reel in cable 12 or can function in other ways sufficient to retrieve and store cable 12. As illustrated, cable puller 33 can be configured with eight wheels having tires for grasping cable 12. In one embodiment of the invention, cable puller 33 can physically loop or fold cable 12 in a storage compartment within vessel 14.

After cable puller 33 grasps cable 12, contact between clamp 24 and cable 12 is no longer necessary to retain cable 12 and attached seismic components. Consequently, buoy 10 and other attached seismic equipment can be detached from cable 12 and stored aboard vessel 14. Cable puller 33 can be operated until the desired section or entire length of cable 12 is removed from water 15. For a damaged section of cable 12, cable 12 can be reeled into vessel 14 until the damaged section of cable 12 is positioned along boom 16 in the position shown in FIG. 2. Repairs can be made to the damaged section of cable 12, and operation of cable puller 33 and wheel 32 can be reversed to pay cable 12 out into water 15.

The invention uniquely facilitates the recovery and repair of severed cables such as seismic cable 12. After one severed end of cable 12 is retained by cable puller 33 as previously described, vessel 14 can be maneuvered to recover a buoy 10 corresponding to the other severed end of cable 12. Boom 16 is rotated until boom 16 is oriented in a position deviating from horizontal, and extension 20 and clamp 24 are extended outwardly relative to base 18. Clamp 24 engages the second buoy 10 of the section of cable 12 associated with the second buoy 10, and the second buoy 10 is retrieved into vessel 14 in the manner previously described for the first buoy 10. After both severed ends of cable 12 have been retrieved to the deck of vessel 14, cable 12 can be repaired with conventional techniques and then released into water 15.

FIG. 4 illustrates a plan view of the invention wherein boom 16 is attached to the starboard side of vessel 14. Wheel 32 and cable puller 33 are engaged with cable 12, extension 20 is retracted relative to base 18, and clamp 24 and buoy 10 are positioned aft of drum 32. Rail 34 is attached to vessel 14 to enclose a safe working area for crew members. Control panel 36, preferably located fore of wheel 32 and cable puller 33, permits remote operation of various components such as the reciprocation of extension 20 relative to base 18, the rotation of boom 16 relative to vessel 14, and the manipulation of clamp 24 to selectively grasp and release cable 12 or buoy 10. Control panel 36 uniquely provides automated control over such activities by a single operator, thereby reducing the need for multiple deck hands wielding grappling hooks and lines. This feature of the invention significantly facilitates safe seismic cable retrieval, particularly in bad weather or rough seas.

Control panel 36 can comprise one operating switch or combination of switches and controls. For example, control panel 36 can comprise a single switch to reciprocate extension 20 relative to base 18. In another embodiment of the invention, control panel 36 can comprise a switch to control pivotal movement of boom 16 relative to vessel 14, to control the operation of clamp 24, or to control the operation of wheel 32 and cable puller 33. Alternatively, control panel 36 can be configured as a combination of separate switches positioned at different locations on vessel 14.

In operation, cable 12 is engaged with clamp 24, cable 12 is lifted from water 15 by retracting extension 20 relative to base 18 and then pivoting boom 16 relative to vessel 14, by pivoting boom 16 relative to vessel and then retracting extension 20 relative to base 18, or a combination of both. The preferred operation sequence will depend on the configuration and operation of boom 16 relative to wheel 32 and cable puller 33. As previously described, boom 16 and cable puller 33 preferably cooperate to retrieve buoy 10 and cable 12 with minimal manual intervention.

Although boom 16 is illustrated as an extensible apparatus having base 18 and extension 20, boom 16 can be configured in other ways sufficient to manipulate clamp 24, and to retrieve cable 12 and buoy 10. For example, boom 16 can comprise an articulated structure 38 capable of moving clamp 24 into contact with cable 12, of lifting clamp 24 and cable 12, and of moving clamp 24 in a substantially horizontal direction relative to vessel 14.

The present invention provides an automated system for capturing and for retrieving a seismic cable from water. The invention permits one person to steer vessel 14, to engage clamp 24 and cable 12, and to retrieve cable 12 onto the deck of vessel 14. The invention reduces crew contact with buoy 10, cable 12 and other seismic equipment and uniquely maximizes the efficiency of seismic cable retrieval operations. The invention is particularly advantageous because the same clamp can be used to retrieve cables and buoys of different sizes and configurations, and a positive, controllable engagement is provided between the clamp and cable. The quantity of the gripping force exerted by the clamp on the cable can be adjusted to meet the equipment configuration and the environmental conditions, and the gripping engagement between the clamp and cable can be enhanced by elastomers and other materials resistant to sliding movement between the clamp and cable.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus supported by a vessel for removing a seismic cable and attached buoy from water, comprising:

a clamp shaped for gripping the cable when the cable is located in the water, wherein said clamp is actuatable to grip the cable at a position proximate to the buoy;

a boom attached to said clamp, wherein said boom is operable to move said clamp into engagement with the cable; and an actuator operable to orient said boom and attached clamp into engagement with the cable, wherein said actuator is further operable to actuate said clamp for gripping the cable at the position proximate to the buoy, to move said boom to lift said clamp and attached cable and buoy above the water, and to move said boom in a substantially horizontal direction relative to the vessel.

2. An apparatus as recited in claim 1, further comprising a cable puller for gripping the cable as the cable is removed from the water.

3. An apparatus as recited in claim 1, wherein said clamp is configured to grip the cable at a position proximate to the buoy and is configured to contact the buoy as said clamp is lifted above the water.

4. An apparatus as recited in claim 1, wherein said boom has a longitudinal axis, and wherein said clamp includes two members actuatable in a direction transverse to said longitudinal axis to grip and to release the cable.

5. An apparatus as recited in claim 1, wherein said clamp includes two angularly disposed members which are moveable about a connecting pivot to releasably grip the cable.

6. An apparatus as recited in claim 1, wherein said boom includes a base having a longitudinal axis and a telescopic extension for reciprocal movement relative to the longitudinal axis of said base.

7. An apparatus as recited in claim 6, wherein said clamp is attached to a distal end of said telescopic extension, and wherein said clamp is manipulatable by pivoting said boom and by moving said telescopic extension relative to the base of said boom.

8. An apparatus as recited in claim 1, further comprising a control panel for controlling operation of said clamp, said boom and said actuator.

9. An apparatus as recited in claim 1, further comprising a control panel for operating said actuator and said boom to move said clamp into a position proximate to the cable, for operating said clamp to grip the cable, for operating said actuator to raise said boom and said clamp above the water, and for operating said actuator to move said clamp and attached cable in a substantially horizontal position relative to the vessel.

10. An apparatus as recited in claim 9, wherein said clamp comprises at least two fork members selectively actuatable to clasp the cable.

11. An apparatus supported by a vessel for removing a seismic cable and attached buoy from water, comprising:

a clamp shaped for releasably gripping the cable when the cable is located in the water, wherein said clamp is actuatable to grip the cable at a position proximate to the buoy;

a boom attached to said clamp, wherein said boom is operable to move said clamp into engagement with the cable, wherein said boom comprises a base and a telescopic extension end attached to said clamp;

an actuator operable to move said boom and attached clamp to a position proximate to the cable, wherein said actuator is further operable to actuate said clamp to grip the cable at a position proximate to the buoy, to move said boom to lift said clamp and attached cable and buoy above the water, and to move said boom in a substantially horizontal orientation relative to the vessel; and a cable puller for gripping the cable as the cable is withdrawn from the water.

12. An apparatus as recited in claim 11, wherein said boom has a longitudinal axis, and wherein said clamp includes two forks operable in a direction transverse to said longitudinal axis for releasably gripping the cable.

13. An apparatus as recited in claim 11, wherein said clamp includes two angularly disposed forks which are moveable about a connecting pivot to releasably grip the cable.

14. An apparatus as recited in claim 11, wherein said actuator is capable of moving said boom into a substantially horizontal orientation before said telescopic extension is retracted relative to said base to move said clamp in a substantially horizontal direction relative to the vessel.

15. An apparatus as recited in claim 11, further comprising a control panel for operating said clamp, actuator and boom.

16. An apparatus as recited in claim 11, wherein said cable puller is operable to withdraw the cable from the water and to permit removal of the buoy from the cable.

17. An apparatus supported by a vessel for removing a seismic cable and attached buoy from water, comprising:

a clamp for releasably gripping the cable;

a boom attached to said clamp for moving said clamp proximate to the cable, wherein said boom is attached proximate to a bow of the vessel and comprises a base and a telescopic extension end attached to said clamp, and wherein said extension end and attached clamp reaches fore of the vessel bow when said extension end is extended relative to the base of said boom;

an actuator engaged with said boom for moving said clamp to a position proximate to the cable, for operating said clamp to grip the cable, for moving said boom to lift said clamp and attached cable above the water, and for moving said boom in a substantially horizontal orientation relative to the vessel; and a cable puller for gripping the cable as the cable is withdrawn from the water.

18. An apparatus supported by a vessel for removing a seismic cable and attached buoy from water, comprising:

a clamp for releasably gripping the cable;

a boom attached to said clamp for moving said clamp proximate to the cable, wherein said boom comprises a base and a telescopic extension end attached to said clamp, wherein said extension is retractable within said base to move the cable from the vessel bow toward a stem of the vessel;

an actuator engaged with said boom for moving said clamp to a position proximate to the cable, for operating said clamp to grip the cable, for moving said boom to lift said clamp and attached cable above the water, and for moving said boom in a substantially horizontal orientation relative to the vessel; and a cable puller for gripping the cable as the cable is withdrawn from the water.

* * * * *